US011061629B2

(12) United States Patent
Suzuki

(10) Patent No.: US 11,061,629 B2
(45) **Date of Patent: *Jul. 13, 2021**

(54) PRINTER AND NON-TRANSITORY COMPUTER-READABLE RECORDING MEDIUM STORING COMPUTER-READABLE INSTRUCTIONS FOR PRINTER

(71) Applicant: Brother Kogyo Kabushiki Kaisha, Nagoya (JP)

(72) Inventor: Satoshi Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,805

(22) Filed: Feb. 4, 2020

(65) Prior Publication Data

US 2020/0174712 A1 Jun. 4, 2020

Related U.S. Application Data

(63) Continuation of application No. 16/360,374, filed on Mar. 21, 2019, now Pat. No. 10,585,632.

(30) Foreign Application Priority Data

Mar. 30, 2018 (JP) ............................ JP2018-068820

(51) Int. Cl.
*G06F 3/12* (2006.01)

(52) U.S. Cl.
CPC ............ *G06F 3/122* (2013.01); *G06F 3/1236* (2013.01); *G06F 3/1238* (2013.01); *G06F 3/1292* (2013.01); *G06F 3/1297* (2013.01)

(58) Field of Classification Search
CPC .... G06F 3/1236; G06F 3/1292; G06F 3/1297; G06F 3/1238; G06F 3/122
(Continued)

(56) References Cited

U.S. PATENT DOCUMENTS 10,178,551 B2 1/2019 Goto
2017/0026833 A1 1/2017 Goto
(Continued)

FOREIGN PATENT DOCUMENTS

EP 2894931 A1 7/2015
JP 2017-28454 A 2/2017
(Continued)

OTHER PUBLICATIONS

Wi-Fi Alliance, "Draft Device Provisioning Protocol Technical Specification", Version 0.2.11, pp. 1-133, 2017.
Aug. 14, 2019—(EP) Extended Search Report—App 19164707.2.

*Primary Examiner* — Helen Zong
(74) *Attorney, Agent, or Firm* — Banner & Witcoff, Ltd.

(57) ABSTRACT

A printer may accept a print instruction; start printing of a code image on a print medium; control an operation state of the printer, wherein in a case where the printing of the code image is completed after the printing of the code image has been started, the operation state of the printer is controlled to be a respondent state, and in a case where the printing of the code image is not completed due to an error occurring after the printing of the code image has been started, the operation state of the printer is controlled to be a non-respondent state; receive an authentication request from a first external device; send the authentication response to the first external device; receive connection information from the first external device; and establish, by using the connection information, a wireless connection between the printer and a second external device.

20 Claims, 8 Drawing Sheets

(58) Field of Classification Search
USPC ........................................................ 358/1.15
See application file for complete search history.

(56) References Cited

U.S. PATENT DOCUMENTS

| | | | | |
|---|---|---|---|---|
| 2017/0026834 | A1 | 1/2017 | Nakajima | |
| 2017/0208465 | A1 | 7/2017 | Terao | |
| 2017/0215070 | A1 | 7/2017 | Sakai | |
| 2018/0069718 | A1 | 3/2018 | Terao | |
| 2018/0077318 | A1* | 3/2018 | Gusmano ............... | H04N 1/444 |

FOREIGN PATENT DOCUMENTS

| | | | |
|---|---|---|---|
| JP | 2017-028458 | A | 2/2017 |
| JP | 2017-130727 | A | 7/2017 |
| JP | 2017-135517 | A | 8/2017 |
| JP | 2018-006983 | A | 1/2018 |
| JP | 2018-37978 | A | 3/2018 |
| WO | 2018-003722 | A1 | 1/2018 |

* cited by examiner (Second Embodiment)

PRINTER AND NON-TRANSITORY COMPUTER-READABLE RECORDING MEDIUM STORING COMPUTER-READABLE INSTRUCTIONS FOR PRINTER

CROSS-REFERENCE

This application is a Continuation of prior U.S. application Ser. No. 16/360,374, filed on Mar. 21, 2019, which claims priority to Japanese Patent Application No. 2018-068820, filed on Mar. 30, 2018, the entire contents of which are incorporated herein by reference.

TECHNICAL FIELD

The disclosure herein discloses a technique related to a printer configured to establish a wireless connection with an external device.

BACKGROUND ART

A technique is known for establishing a wireless connection between a printer and an Access Point (AP) by using a smartphone. In response to accepting an operation by a user, the printer displays a QR code (registered trademark) including information for executing setting of communication parameters and shifts to a reception stand-by state for an authentication request. The smartphone obtains the information for executing setting of the communication parameters by reading the QR code displayed on the printer, sends the authentication request to the printer, and receives an authentication response from the printer. Then, the smartphone uses the obtained information to set the communication parameters, and sends the set communication parameters to the printer. Further, the smartphone executes the similar processes with the AP and sends the communication parameters to the AP. Due to this, the printer can use the received communication parameters to establish the wireless connection with the AP. Further, the printer may be configured to print the QR code, instead of displaying the QR code.

SUMMARY

The printer normally has a higher processing load in the receipt stand-by state as above than in a state of not being in the receipt stand-by state. Further, in the configuration that the printer prints the QR code, there may be a situation in which the smartphone cannot read the QR code because an error (such as a paper jam) occurs in the printer upon printing the QR code and the printing of the QR code thereby fails. In such a case, the printer may continue to be in the receipt stand-by state despite the authentication request not being sent from the smartphone to the printer. That is, the printer may continue to be in the state with the high processing load.

The disclosure herein aims to reduce a processing load on a printer in a technique capable of establishing a wireless connection between a printer and a second external device by using a first external device.

A printer disclosed herein may comprise: a print executing unit; a wireless interface; a processor; and a memory storing computer-readable instructions therein, the computer-readable instructions, when executed by the processor, causing the printer to: accept a print instruction; after the print instruction has been accepted, cause the print executing unit to start printing of a code image on a print medium, the code image being obtained by coding a public key, wherein in a case where the code image printed on the print medium is image-captured by a first external device, the public key is obtained by the first external device; control an operation state of the printer, wherein in a case where the printing of the code image is completed after the printing of the code image has been started, the operation state of the printer is controlled to be a respondent state, the respondent state being a state in which an authentication response is sent to the first external device in response to receiving an authentication request in which the public key is used from the first external device, and in a case where the printing of the code image is not completed due to an error occurring in the print executing unit after the printing of the code image has been started, the operation state of the printer is controlled to be a non-respondent state, the non-respondent state being a state in which the authentication response is not sent in response to receiving the authentication request from the first external device; receive the authentication request from the first external device via the wireless interface; in a case where the authentication request is received from the first external device in a situation where the operation state of the printer is the respondent state, send the authentication response to the first external device via the wireless interface; after the authentication response has been sent to the first external device, receive connection information from the first external device via the wireless interface, the connection information being for establishing a wireless connection between the printer and a second external device via the wireless interface; and in a case where the connection information is received from the first external device, establish, by using the connection information, the wireless connection between the printer and the second external device via the wireless interface.

Another printer disclosed herein may comprise: a print executing unit; a wireless interface; a processor; and a memory storing computer-readable instructions therein, the computer-readable instructions, when executed by the processor, causing the printer to: accept a print instruction; after the print instruction has been accepted, cause the print executing unit to start printing of a code image on a print medium, the code image being obtained by coding a public key, wherein in a case where the code image printed on the print medium is image-captured by a first external device, the public key is obtained by the first external device; control an operation state of the printer, wherein after the print instruction has been accepted, the operation state of the printer is shifted from a non-respondent state to a respondent state, the non-respondent state being a state in which an authentication response is not sent in response to receiving an authentication request in which the public key is used from the first external device, the respondent state being a state in which the authentication response is sent to the first external device in response to receiving the authentication request from the first external device, and in a case where a specific condition is satisfied in a situation where the operation state of the printer is the respondent state after the print instruction has been accepted, the operation state of the printer is shifted from the respondent state to the non-respondent state; receive the authentication request from the first external device via the wireless interface; in a case where the authentication request is received from the first external device in a situation where the operation state of the printer is the respondent state, send the authentication response to the first external device via the wireless interface; after the authentication response has been sent to the first external device, receive connection information from the first external device via the wireless interface, the connection information being for establishing a wireless connection between the printer and a second external device via the wireless interface; and in a case where the connection information is received from the first external device, establish, by using the connection information, the wireless connection between the printer and the second external device via the wireless interface.

Computer programs for realizing the above printers and non-transitory computer-readable recording media that store these computer programs are also novel and useful. Further, methods performed by the above printers are also novel and useful. In addition, communication systems comprising the above printers and another device (e.g., the first external device, the second external device) are also novel and useful.

EMBODIMENTS (First Embodiment)

Figure 1:
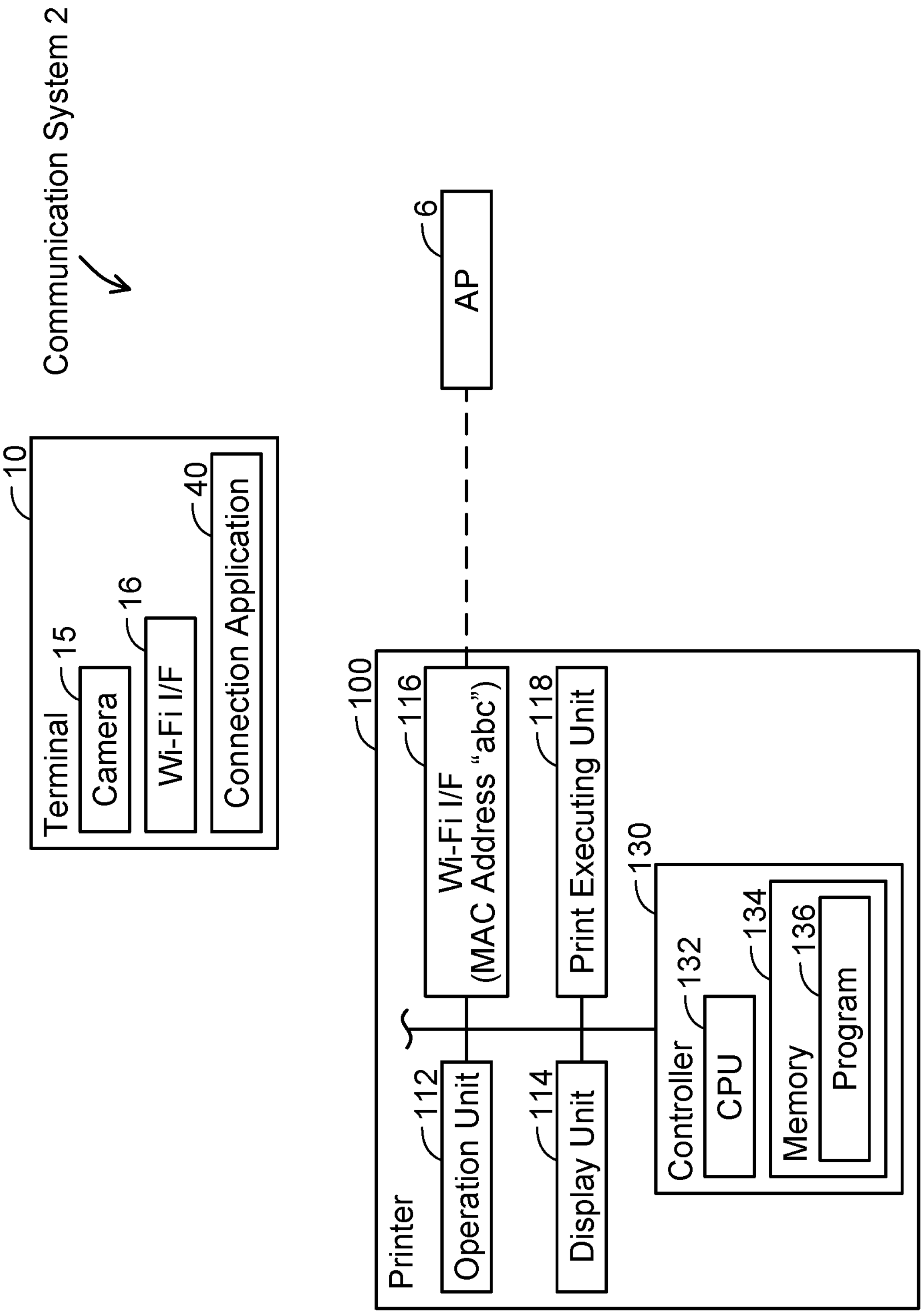
FIG. 1 shows a configuration of a communication system.

(Configuration of Communication System 2; FIG. 1)

As shown in FIG. 1, a communication system 2 is provided with an Access Point (AP) 6, a terminal 10, and a printer 100. In this embodiment, a situation is assumed in which a user uses the terminal 10 to establish a wireless connection according to a Wi-Fi scheme (hereinbelow termed "Wi-Fi connection") between the printer 100 and the AP 6.

(Configuration of Terminal 10)

The terminal 10 is a mobile terminal device such as a cellphone (such as a smartphone), a PDA, or a tablet PC. In a variant, the terminal 10 may be a stationary PC, or a laptop PC. The terminal 10 is provided with a camera 15 and a Wi-Fi interface 16. Hereinbelow, an interface will be denoted simply as "I/F". The camera 15 is a device for capturing an image of an object, and in this embodiment, it is used especially to capture a QR code for the AP 6 and the printer 100. Further, the terminal 10 stores a connection application 40 (hereinbelow termed simply as "app 40"). The app 40 is a program for establishing the Wi-Fi connection between the printer 100 and the AP 6, and may be installed to the terminal 10, for example, from a server on the Internet provided by a vendor of the printer 100.

The Wi-Fi I/F 16 is a wireless interface configured to execute Wi-Fi communication according to the Wi-Fi scheme. The Wi-Fi scheme is a wireless communication scheme for executing wireless communication according to 802.11 standard of IEEE (the Institute of Electrical and Electronics Engineers, Inc.) and standards complying thereto (such as 802.11a, 11b, 11g, 11n, etc.), for example. The Wi-Fi I/F 16 especially supports a Device Provisioning Protocol (DPP) scheme that is to be established by the Wi-Fi Alliance. The DPP scheme is described in the standard draft "DRAFT Device Provisioning Protocol Technical Specification Version 0.2.11" created by the Wi-Fi Alliance, and is a wireless communication scheme for easily establishing a Wi-Fi connection between a pair of devices (such as the printer 100 and the AP 6) by using the terminal 10.

(Configuration of Printer 100)

The printer 100 is a peripheral (e.g., a peripheral of the terminal 10) capable of executing a print function. The printer 100 is provided with an operation unit 112, a display unit 114, a Wi-Fi I/F 116, a print executing unit 118, and a controller 130. The respective units 112 to 130 are connected to a bus line (for which a reference sign is not given).

The operation unit 112 is provided with a plurality of keys. The user can input various instructions to the printer 100 by operating the operation unit 112. The display unit 114 is a display configured to display various types of information. However, the display unit 114 is a display in a relatively small size (for example, a size that can display only one line of character string). Due to this, the display unit 114 cannot display a QR code to be described later. By employing the display having such a relatively small size as the display unit 114, the printer 100 may be manufactured at lower cost. In a variant, the printer 100 may not be provided with the display unit 114. The Wi-Fi I/F 116 is similar to the Wi-Fi I/F 16 of the terminal 10. That is, the Wi-Fi I/F 116 supports the DPP scheme. Further, the Wi-Fi I/F 116 is assigned with a MAC address "abc". The print executing unit 118 includes a print mechanism of an inkjet scheme or a laser scheme.

The controller 130 includes a CPU 132 and a memory 134. The CPU 132 is configured to execute various processes according to a program 136 stored in the memory 134. The memory 134 is constituted of a volatile memory, a nonvolatile memory and the like.

Figure 2:
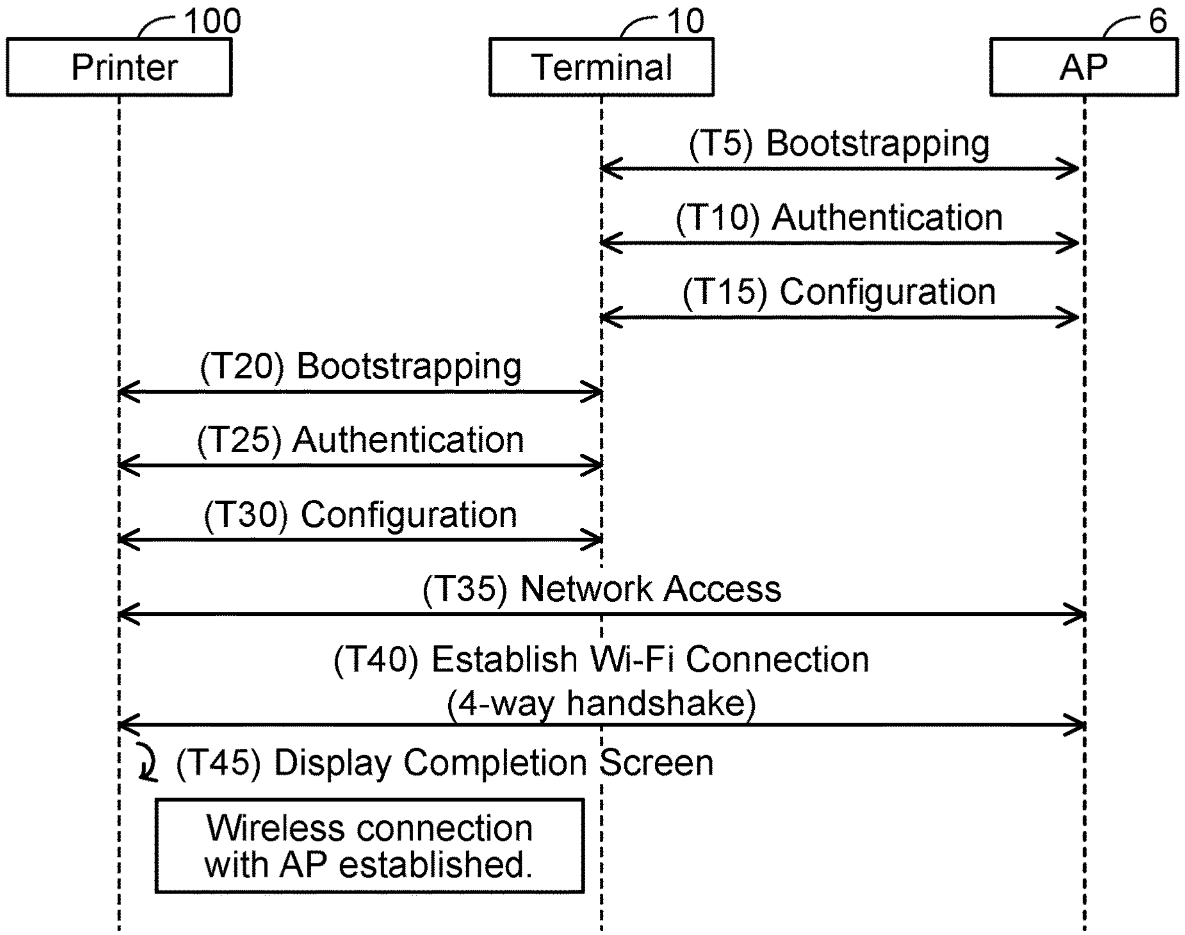
FIG. 2 shows an explanatory diagram for explaining an overview of an embodiment.

(Overview of Embodiment; FIG. 2)

Next, an overview of the present embodiment will be described with reference to FIG. 2. As aforementioned, the terminal 10 and the printer 100 support the DPP scheme, and further the AP 6 also supports the DPP scheme. In this embodiment, the Wi-Fi connection between the printer 100 and the AP 6 is established by each of the devices 6, 10, 100 executing communication according to the DPP scheme. Hereinbelow, to facilitate understanding, operations which CPUs (such as the CPU 132) of the respective devices execute will be described with the devices (such as the printer 100) as subjects of action instead of describing the operations with the CPUs as the subjects of action.

In T5, the terminal 10 executes Bootstrapping (hereinbelow termed simply as "BS") according to the DPP scheme with the AP 6. This BS is a process of providing information that is to be used in Authentication (hereinbelow termed simply as "Auth") of T10 (to be described later) from the AP 6 to the terminal 10 in response to a QR code adhered to the AP 6 being captured by the terminal 10.

In T10, the terminal 10 executes Auth according to the DPP scheme with the AP 6 by using the information obtained in the BS of T5. This Auth is a process for the terminal 10 and the AP 6 to authenticate their communication counterparts.

In T15, the terminal 10 executes Configuration (hereinbelow termed simply as "Config") according to the DPP scheme with the AP 6. This Config is a process of sending information for establishing the Wi-Fi connection between the printer 100 and the AP 6 to the AP 6. Specifically, in the Config, the terminal 10 creates a first Configuration Object (hereinbelow, Configuration Object is simply be termed "CO") for establishing the Wi-Fi connection between the printer 100 and the AP 6, and sends the first CO to the AP 6. As a result, the first CO is stored in the AP 6.

Next, in T20, the terminal 10 executes BS according to the DPP scheme with the printer 100. This BS is a process of providing information to be used in Auth in T25 (to be described later) from the printer 100 to the terminal 10 in response to a QR code printed by the printer 100 being image-captured by the terminal 10. As aforementioned, the display unit 114 of the printer 100 has a relatively small size, thus it cannot display the QR code. In this embodiment, since the printer 100 prints the QR code instead of displaying it, the information to be used in the Auth can suitably be provided to the terminal 10. Here, a configuration of a comparative example may be considered in which the QR code is adhered to the printer 100. In this configuration, the QR code can easily be image-captured by a third party. That is, the third party can easily obtain the information of the printer 100, which is undesirable in terms of security aspects. Contrary to this, in this embodiment, the printer 100 prints the QR code, and as such, the security can be improved as compared to the aforementioned comparative example.

In T25, the terminal 10 executes Auth according to the DPP scheme with the printer 100 by using the information obtained in the BS of T20. This Auth is a process for the terminal 10 and the printer 100 to authenticate their communication counterparts.

In T30, the terminal 10 executes Config according to the DPP scheme with the printer 100. This Config is a process of sending information for establishing the Wi-Fi connection between the printer 100 and the AP 6 to the printer 100. In this Config, the terminal 10 creates a second CO for establishing the Wi-Fi connection between the printer 100 and the AP 6, and sends the second CO to the printer 100. As a result, the second CO is stored in the printer 100.

In T35, the printer 100 and the AP 6 use the stored first and second COs to execute Network Access (hereinbelow termed simply as "NA") according to the DPP scheme. The NA is a process of sharing a connection key for establishing the Wi-Fi connection between the printer 100 and the AP 6.

In T40, the printer 100 and the AP 6 execute 4way-handshake communication. In at least a part of the 4way-handshake communication, the printer 100 and the AP 6 communicate encrypted information encrypted by the connection key shared in the NA in T35. Further, in a case where decryption of the encrypted information succeeds, the Wi-Fi connection is established between the printer 100 and the AP 6. Due to this, the printer 100 can participate, as a child station, in a wireless network formed by the AP 6, as a result of which the printer 100 can execute communication via the AP 6 with other devices participating in the wireless network. In a variant, the printer 100 and the AP 6 may execute Simultaneous Authentication of Equals (SAE, also called "Dragonfly") communication, instead of the 4way-handshake communication.

In T45, the printer 100 causes the display unit 114 to display a completion screen indicating that the Wi-Fi connection has been established with the AP 6. When the process of T45 is completed, the process of FIG. 2 is terminated.

In the DPP scheme, in order to establish the Wi-Fi connection between the printer 100 and the AP 6, the user does not need to input information of the wireless network in which the AP 6 operates as a parent station (such as a Service Set Identifier (SSID) and a password) to the printer 100. As such, the user can easily establish the Wi-Fi connection between the printer 100 and the AP 6.

(Description on Respective Processes; FIGS. 3 to 7)

Next, details of the respective processes executed in T20 to T35 of FIG. 2 will be described with reference to FIGS. 3 to 7. Since the processes of T5 to T15 are similar to the processes of T20 to T30 except that the AP 6 is used instead of the printer 100, detailed descriptions thereof will be omitted.

Figure 3:
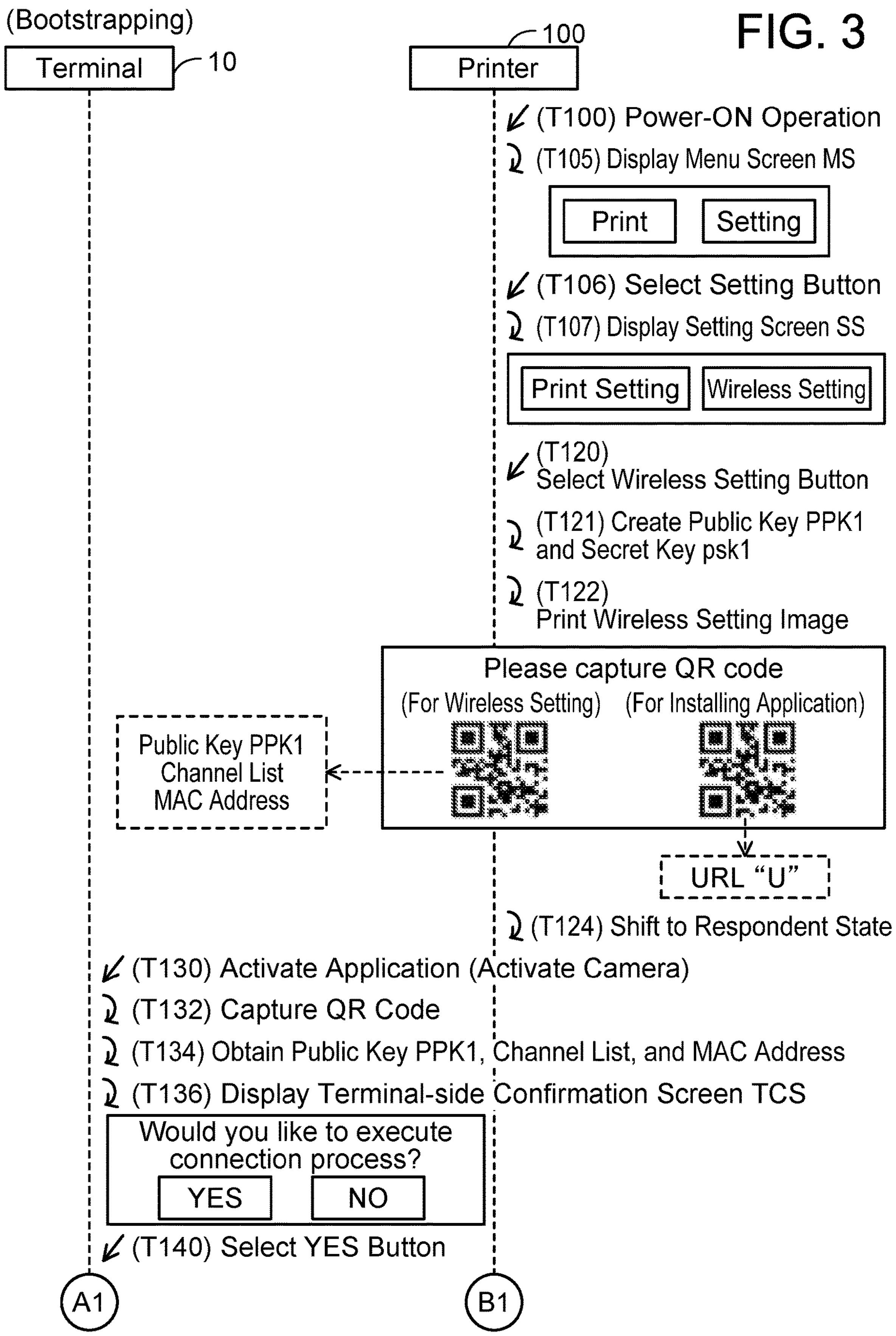
FIG. 3 shows a sequence diagram of a Bootstrapping process.

(Bootstrapping (BS) of Case A; FIG. 3)

Firstly, a process of the BS in T20 of FIG. 2 will be described with reference to FIG. 3. In response to accepting a power-ON operation by the user in T100, the printer 100 causes the display unit 114 to display a menu screen MS in T105. The screen MS is a default screen of the printer 100 in other words, and includes a print button for causing the printer 100 to execute print and a setting button for designating various settings (such as print setting) of the printer 100.

In response to the setting button in the screen MS being selected by the user in T106, the printer 100 causes the display unit 114 to display a setting screen SS in T107. The screen SS includes a print setting button for changing print settings of the printer 100 and a wireless setting button for executing wireless setting of the printer 100. As described above, the QR code printed by the printer 100 is used in the process of the BS in T20 of FIG. 2. As such, the wireless setting button is a button for instructing the printer 100 to print the QR code, in other words.

In response to the wireless setting button in the screen SS being selected by the user in T120, the printer 100 creates a public key PPK1 and a secret key psk1 in T121. Then, the printer 100 creates a wireless setting QR code by coding the created public key PPK1, a channel list stored in advance in the memory 134, and the MAC address "abc" of the Wi-Fi I/F 116. The channel list is a list of values of a plurality of communication channels to be used in the Auth (see T25 of FIG. 2).

In T122, the printer 100 creates wireless setting image data that represents a wireless setting image by using the created wireless setting QR code. The wireless setting image includes the wireless setting QR code and an app installation QR code. The app installation QR code is a code image in which a URL "U" indicating a location of the app 40 is coded. This QR code may be created by the printer 100 upon when the process of T122 is executed, or may be stored in advance in the memory 134 at a shipping of the printer 100. Next, the printer 100 supplies the wireless setting image data to the print executing unit 118 and causes the print executing unit 118 to print the wireless setting image. Since the wireless setting image includes the app installation QR code, the user can install the app 40 in the terminal 10 by using the terminal 10 to capture the QR code in a situation where the app 40 had not been installed in the terminal 10. As such, user's convenience is improved.

Next, in T124, the printer 100 shifts from a non-respondent state to a respondent state. The non-respondent state is a state in which the Wi-Fi I/F 116 does not send a DPP Authentication Response (hereinbelow simply termed "ARes") (see T210 of FIG. 4 to be described later) even if a DPP Authentication Request (hereinbelow simply termed "AReq") is received from the terminal 10 (see T200 to be described later). The respondent state is a state in which the Wi-Fi I/F 116 sends the ARes to the terminal 10 in response to receiving the AReq from the terminal 10. That is, the printer 100 shifts to a state of being able to execute the Auth (see T25 of FIG. 2) by shifting from the non-respondent state to the respondent state. Specifically, in this embodiment, the non-respondent state is a state in which even if the Wi-Fi I/F 116 receives a signal from outside, it does not supply the signal to the CPU 132. Further, the respondent state is a state in which in response to receiving a signal from outside, the Wi-Fi I/F 116 supplies the signal to the CPU 132 and sends a response for this signal. Since the respondent state is a state in which the CPU 132 processes the signal received from outside, processing load in that state is higher than that in the non-respondent state. In a variant, the non-respondent state may be a state in which electricity is not supplied to the Wi-Fi I/F 116, and the respondent state may be a state in which electricity is supplied to the Wi-Fi I/F 116. Further, in another variant, the non-respondent state may be a state in which even if the Wi-Fi I/F 116 receives the AReq from outside, the Wi-Fi I/F 116 does not supply a notification that the AReq has been received to the CPU 132, and the respondent state may be a state in which in response to receiving the AReq from outside, the Wi-Fi I/F 116 supplies a notification that the AReq has been received to the CPU 132.

In T130, the terminal 10 activates the app 40 in response to accepting an activation operation for the app 40 by the user, and further activates the camera 15. Following processes to be executed by the terminal 10 are realized by the app 40. Next, in T132, the terminal 10 captures the wireless setting QR code (see T122) in the printed wireless setting image by using the camera 15. Then, the terminal 10 decodes the captured QR code in T134 and obtains the public key PPK1, the channel list, and the MAC address “abc”.

In T136, the terminal 10 displays a terminal-side confirmation screen TCS for inquiring the user whether or not to execute a connection process for establishing the Wi-Fi connection between the printer 100 and the AP 6. The screen TCS includes a YES button indicating that the connection process is to be executed and a NO button indicating that the connection process is not to be executed. In T140, the terminal 10 accepts a selection of the YES button in the screen TCS by the user. When the process of T140 is completed, the process of FIG. 3 is terminated.

Figure 4:
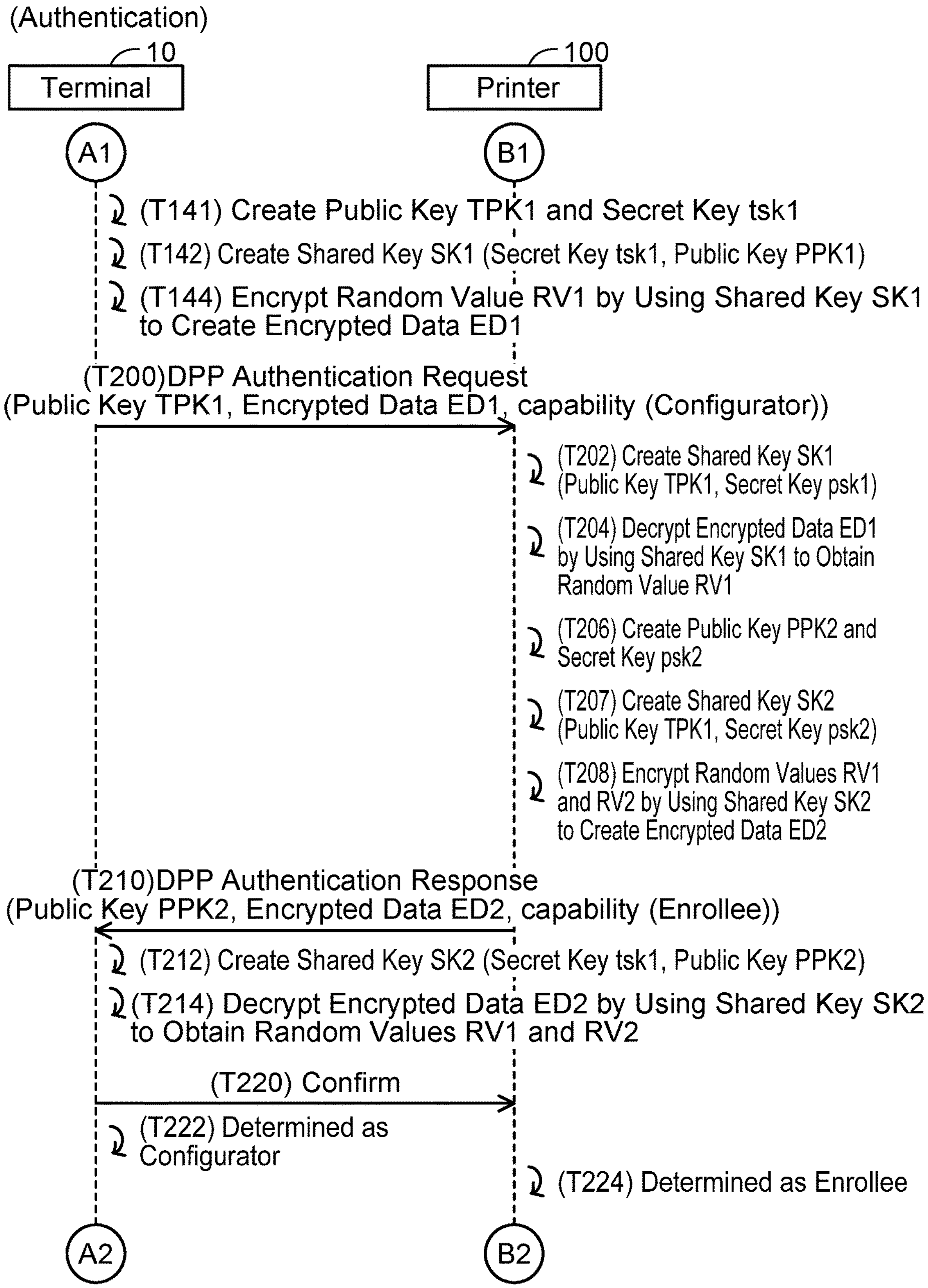
FIG. 4 shows a sequence diagram of an Authentication process.

(Authentication (Auth); FIG. 4)

Next, the process of the Auth in T25 of FIG. 2 will be described with reference to FIG. 4. In response to the YES button in the screen TCS being selected by the user in T140 of FIG. 3, the terminal 10 creates a public key TPK1 and a secret key tsk1 of the terminal 10 in T141. Next, in T142, the terminal 10 creates a shared key SK1 according to Elliptic curve Diffie-Hellman key exchange (ECDH) by using the created secret key tsk1 and the public key PPK1 of the printer 100 obtained in T134 of FIG. 3. Then, in T144, the terminal 10 creates encrypted data ED1 by using the created shared key SK1 to encrypt a random value RV1.

In T200, the terminal 10 sends an AReq via the Wi-Fi I/F 16 to the printer 100 by setting the MAC address “abc” obtained in T134 of FIG. 3 as its destination. The AReq is a signal for requesting the printer 100 to execute authentication. Here, the terminal 10 repeats sending the AReq to the printer 100 by sequentially using the plurality of communication channels in the channel list obtained in T134. The AReq includes the public key TPK1 of the terminal 10 created in T141, the encrypted data ED1 created in T144, and a capability of the terminal 10.

The capability is information that is pre-designated in a device supporting the DPP scheme, and includes any one of the following values: a value indicating that this device is capable of operating only as a Configurator according to the DPP scheme, a value indicating that this device is capable of operating only as an Enrollee according to the DPP scheme, and a value indicating that this device is capable of operating whichever one of the Configurator and the Enrollee. The Configurator refers to a device configured to send a CO used in the NA (T35 of FIG. 2) to an Enrollee in the Config (T30 of FIG. 2). On the other hand, the Enrollee refers to a device that receives the CO used in the NA from the Configurator in the Config. As above, in this embodiment, the terminal 10 creates the first and second COs and sends them respectively to the AP 6 and the printer 100. As such, the capability of the terminal 10 includes the value indicating that it is capable of operating only as the Configurator.

The printer 100 receives the AReq from the terminal 10 via the Wi-Fi I/F 116 in T200. As above, this AReq is sent with the MAC address “abc” of the printer 100 as the destination. As such, the printer 100 can suitably receive this AReq from the terminal 10.

Further, when the printer 100 shifts to the respondent state in T124 of FIG. 3, it monitors receipt of the AReq by using one communication channel among the plurality of communication channels in the channel list. As above, the AReq in T200 is sent by sequentially using the plurality of communication channels in the channel list. As such, the printer 100 can suitably receive this AReq from the terminal 10.

Next, the printer 100 executes following processes for authenticating the sender of the AReq (that is, the terminal 10). Specifically, firstly, in T202, the printer 100 creates a shared key SK1 according to the ECDH by using the public key TPK1 of the terminal 10 in the AReq and the secret key psk1 of the printer 100 created in T121 of FIG. 3. Here, the shared key SK1 created by the terminal 10 in T142 and the shared key SK1 created by the printer 100 in T204 are identical to each other. Thus, the printer 100 can suitably decrypt the encrypted data ED1 in the AReq by using the created shared key SK1 in T204, as a result of which it can obtain the random value RV1. In a case where the decryption of the encrypted data ED1 succeeds, the printer 100 determines that the sender of the AReq is the device that captured the wireless setting QR code printed by the printer 100, that is, determines that the authentication succeeded, and executes subsequent processes from T206. On the other hand, in a case where the decryption of the encrypted data ED1 does not succeed, the printer 100 determines that the sender of the AReq is not the device that captured the wireless setting QR code printed by the printer 100, that is, determines that the authentication failed, and does not execute the subsequent processes from T206.

In T206, the printer 100 creates a new public key PPK2 and a new secret key psk2 of the printer 100. In a variant, the public key PPK2 and the secret key psk2 may be stored in advance in the memory 134. Next, in T207, the printer 100 creates a shared key SK2 according to the ECDH by using the public key TPK1 of the terminal 10 in the AReq of T200 and the created secret key psk2 of the printer 100. Then, in T208, the printer 100 creates encrypted data ED2 by using the created shared key SK2 to encrypt the obtained random value RV1 and a new random value RV2.

In T210, the printer 100 sends an ARes to the terminal 10 via the Wi-Fi I/F 116. This ARes includes the public key PPK2 of the printer 100 created in T206, the encrypted data ED2 created in T208, and a capability of the printer 100. This capability includes the value indicating that the printer 100 is capable of operating only as the Enrollee.

In response to receiving the ARes from the printer 100 via the Wi-Fi I/F 16 in T210, the terminal 10 executes following processes for authenticating the sender of the ARes (that is, the printer 100). Specifically, firstly in T212, the terminal 10 creates a shared key SK2 according to the ECDH by using the secret key tsk1 of the terminal 10 created in T141 and the public key PPK2 of the printer 100 in the ARes. Here, the shared key SK2 created by the printer 100 in T207 and the shared key SK2 created by the terminal 10 in T212 are identical to each other. Thus, the terminal 10 can suitably decrypt the encrypted data ED2 in the ARes by using the created shared key SK2 in T214, as a result of which it can obtain the random values RV1 and RV2. In a case where the decryption of the encrypted data ED2 succeeds, the terminal 10 determines that the sender of the ARes is the device that printed the captured wireless setting QR code, that is, determines that the authentication succeeded, and executes subsequent processes from T220. On the other hand, in a case where the decryption of the encrypted data ED2 does not succeed, the terminal 10 determines that the sender of the ARes is not the device that printed the captured wireless setting QR code, that is, determines that the authentication failed, and does not execute the subsequent processes from T220.

In T220, the terminal 10 sends a Confirm to the printer 100 via the Wi-Fi I/F 16. The Confirm includes information indicating that the terminal 10 operates as the Configurator and the printer 100 operates as the Enrollee. As a result, the terminal 10 determines to operate as the Configurator in T222, and the printer 100 determines to operate as the Enrollee in T224. When the process of T224 is completed, the process of FIG. 4 is terminated. When the process of FIG. 4 is terminated, the terminal 10 discards the public key TPK1 and the secret key tsk1 (that is, deletes them from its memory), and the printer 100 discards the public key PPK1 and the secret key psk1.

Figure 5:
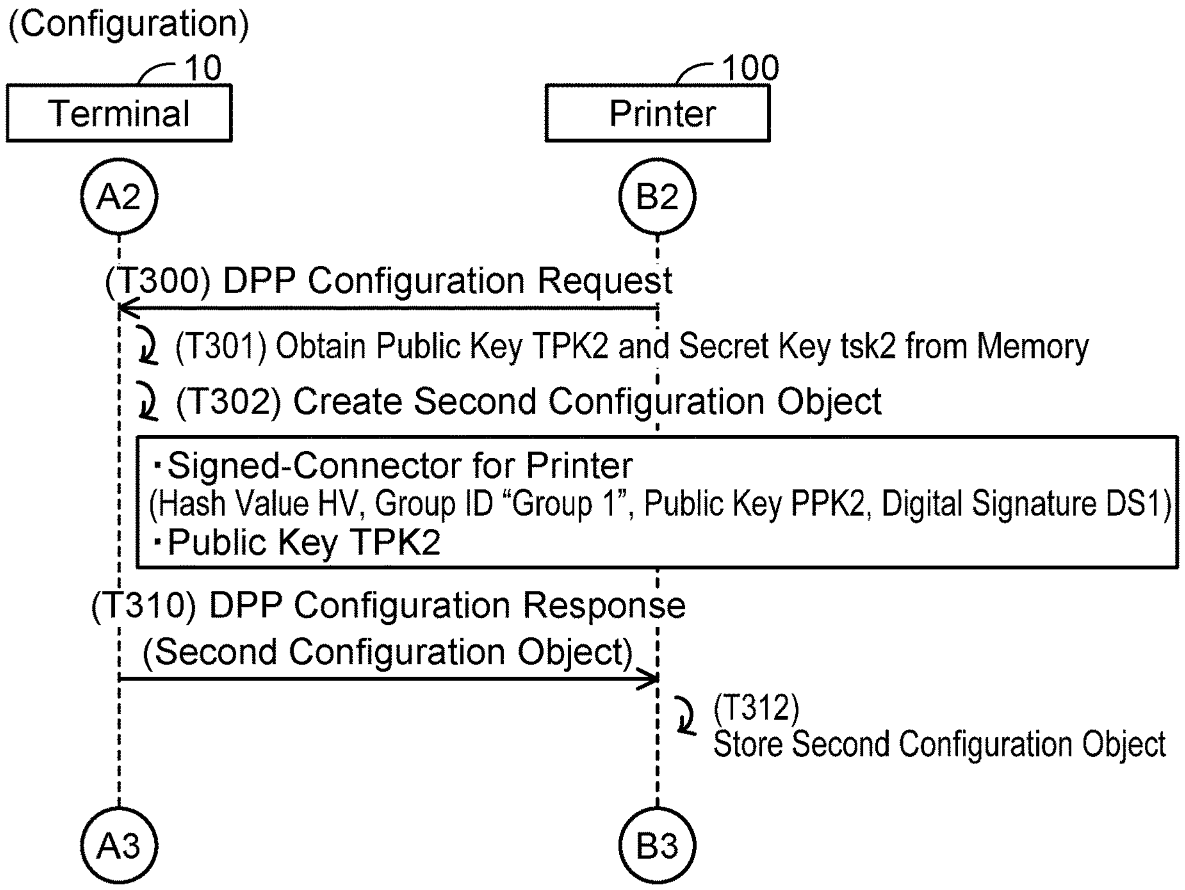
FIG. 5 shows a sequence diagram of a Configuration process.

(Configuration (Config); FIG. 5)

Next, the process of Config in T30 of FIG. 2 will be described with reference to FIG. 5. In T300, the printer 100 sends a DPP Configuration Request (hereinbelow termed simply as "CReq") to the terminal 10 via the Wi-Fi I/F 116. This CReq is a signal requesting the CO (that is, the information for establishing the Wi-Fi connection between the printer 100 and the AP 6) to be sent.

The terminal 10 receives the CReq from the printer 100 in T300 via the Wi-Fi I/F 16. In this case, the terminal 10 obtains a group ID "Group1", a public key TPK2, and a secret key tsk2 from the memory (not shown) of the terminal 10 in T301. As aforementioned, the terminal 10 have already executed the Config in T15 of FIG. 2 with the AP 6, and at that occasion the terminal 10 created the group ID "Group1", the public key TPK2, and the secret key tsk2 and stored the same in the memory. The group ID "Group1" is information for identifying a wireless network formed by the Wi-Fi connection being established between the printer 100 and the AP 6. In a variant, a character string designated by the user may be used as the group ID. That is, in T301, the terminal 10 obtains the respective information that were stored in T15 of FIG. 2. Next, in T302, the terminal 10 creates the second CO (see T30 of FIG. 2). Specifically, the terminal 10 executes following processes.

The terminal 10 creates a hash value HV by hashing the public key TPK2 of the terminal 10. Further, the terminal 10 creates a specific value by hashing a combination of the hash value HV, the group ID "Group1", and the public key PPK2 of the printer 100 in the ARes in T210 of FIG. 4. Then, the terminal 10 creates a digital signature DS1 by using the secret key tsk2 of the terminal 10 to encrypt the created specific value in accordance with an Elliptic Curve Digital Signature Algorithm (ECDSA). As a result, the terminal 10 can create a Signed-Connector for printer (hereinbelow, the Signed-Connector is termed simply as "SCont") including the hash value HV, the group ID "Group1", the public key PPK2 of the printer 100, and the digital signature DS1. Further, the terminal 10 creates the second CO including the SCont for printer and the public key TPK2 of the terminal 10.

In T310, the terminal 10 sends a DPP Configuration Response (hereinbelow termed simply as "CRes") including the second CO to the printer 100 via the Wi-Fi I/F 16.

The printer 100 receives the CRes from the terminal 10 in T310 via the Wi-Fi I/F 116. In this case, the printer 100 stores the second CO in the CRes in the memory 134 in T312. When the process of T312 is completed, the process of FIG. 5 is terminated.

Figure 6:
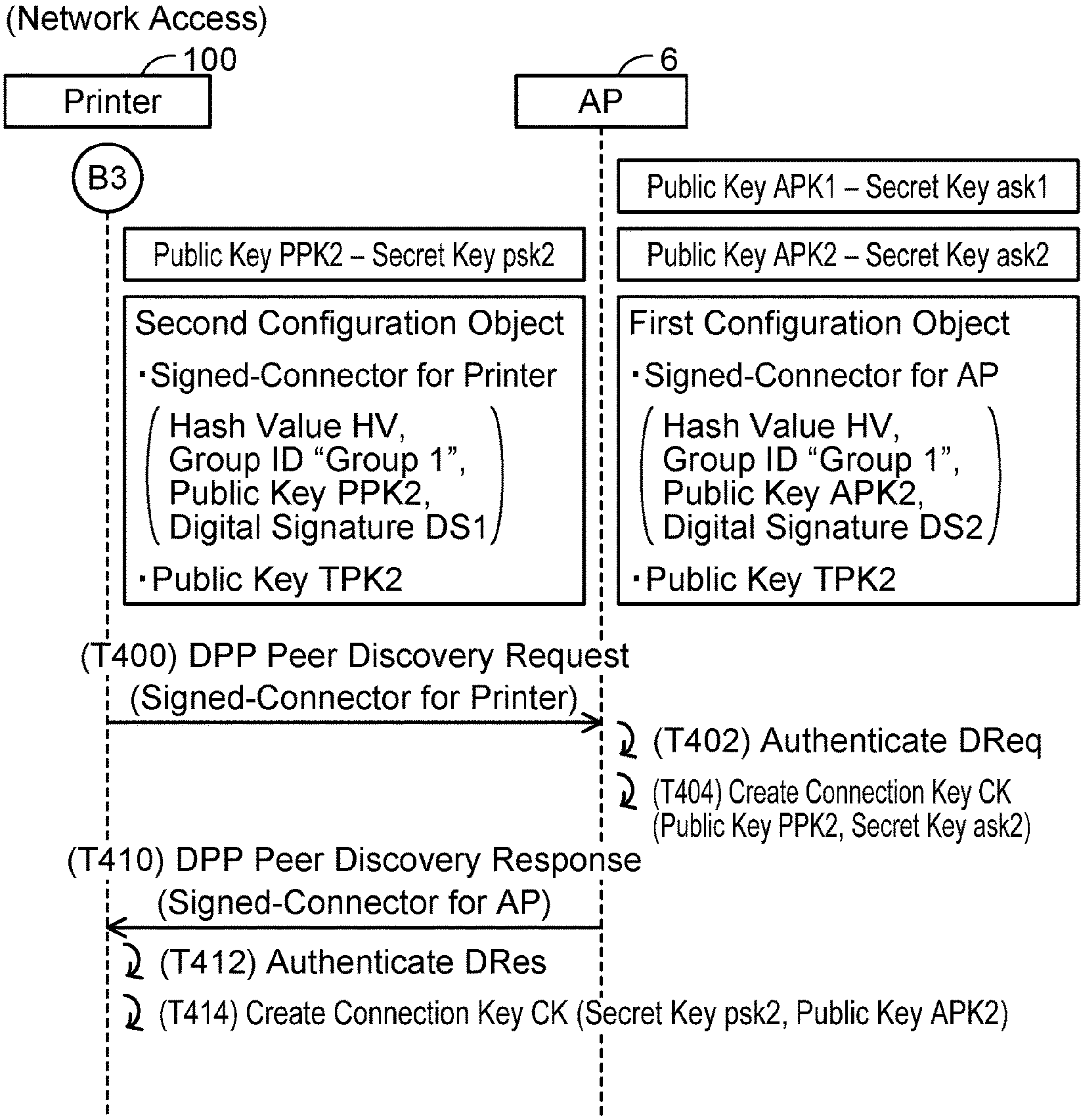
FIG. 6 shows a sequence diagram of a Network Access process.

(Network Access (NA); FIG. 6)

Next, the process of the NA in T35 of FIG. 2 executed between the printer 100 and the AP 6 will be described with reference to FIG. 6. As aforementioned, the processes of T5 to T15 of FIG. 2 have already been executed between the terminal 10 and the AP 6, similarly to T20 to T30 of FIG. 2. However, the AP 6 does not execute the processes of T105 to T124 of FIG. 3. The AP 6 stores in advance a public key APK1 and a secret key ask1 of the AP 6. Further, a QR code, which is obtained by coding the public key APK1 of the AP 6, a channel list of the AP 6, and a MAC address of the AP 6, is adhered to a housing of the AP 6. Processes similar to the processes from T134 are executed between the terminal 10 and the AP 6 when the terminal 10 captures this QR code. As a result, the AP 6 stores a public key APK2 and a secret key ask2 of the AP 6 (see T206 of FIG. 4), and further stores the first CO received from the terminal 10 (see T312 of FIG. 5). The first CO includes a SCont for AP and a public key TPK2 of the terminal 10. This public key TPK2 is identical to the public key TPK2 included in the second CO. Further, the SCont for AP includes a hash value HV, a group ID "Group1", the public key APK2 of the AP 6, and a digital signature DS2. This hash value HV and this group ID "Group1" are respectively identical to the hash value HV and the group ID "Group1" included in the second CO. The digital signature DS2 is information in which a specific value, which is obtained by hashing a combination of the hash value HV, the group ID "Group1", and the public key APK2, is encrypted by the secret key tsk2 of the terminal 10, and is a value different from the digital signature DS1 included in the second CO.

In T400, the printer 100 sends a DPP Peer Discovery Request (hereinbelow termed simply as "DReq") including the SCont for printer to the AP 6 via the Wi-Fi I/F 116. This DReq is a signal requesting the AP 6 to execute authentication and send the SCont for AP.

In response to receiving the DReq from the printer 100 in T400, the AP 6 executes a process for authenticating the sender of the DReq (that is, the printer 100) and the information in the DReq (that is, the hash value HV, the "Group1", and the public key PPK2). Specifically, in T402, the AP 6 firstly executes a first AP determination process that is regarding whether or not the hash value HV and the group ID "Group1" in the received SCont for printer are respectively identical to the hash value HV and the group ID "Group1" in the SCont for AP included in the stored first CO. In the case of FIG. 6, the AP 6 determines "identical" in the first AP determination process, thus it determines that the authentication of the sender of the DReq (that is, the printer 100) succeeds. Here, the fact that the hash value HV in the received SCont for printer is identical to the hash value HV in the SCont for AP included in the stored first CO means that the SCont for printer and the SCont for AP were created by the same device (that is, the terminal 10). As such, the AP 6 also determines that authentication of the creator of the received SCont for printer (that is, the terminal 10) succeeds. Further, the AP 6 decrypts the digital signature DS1 in the received SCont for printer by using the public key TPK2 of the terminal 10 included in the stored first CO. Since the decryption of the digital signature DS1 succeeds in the case of FIG. 6, the AP 6 executes a second AP determination process that is regarding whether or not a specific value obtained by decrypting the digital signature DS1 is identical to a value obtained by hashing the information in the received SCont for printer (that is, the hash value HV, the "Group1", and the public key PPK2). In the case of FIG. 6, the AP 6 determines "identical" in the second AP determination process, thus it determines that the authentication of the information in the DReq succeeds, and executes processes from T404. The fact that the AP6 determines "identical" in the second AP determination process means that the information in the received SCont for printer (that is, the hash value HV, the "Group1", and the public key PPK2) has not been tampered by a third party since the second CO was stored in the printer 100. On the other hand, in a case where the AP 6 determines "not identical" in the first AP determination process, in a case where the decryption of the digital signature DS1 fails, or in a case where the AP 6 determines "not identical" in the second AP determination process, the AP 6 determines that the authentication fails and does not execute the processes from T404.

Next, in T404, the AP 6 creates a connection key CK (that is, a shared key) by using the obtained public key PPK2 of the printer 100 and the stored secret key ask2 of the AP 6 in accordance with the ECDH.

In T410, the AP 6 sends a DPP Peer Discovery Response (hereinbelow termed simply as "DRes") including the SCont for AP to the printer 100.

In response to receiving the DRes from the AP 6 in T410 via the Wi-Fi I/F 116, the printer 100 executes a process for authenticating the sender of the DRes (that is, the AP 6) and the information in the DRes (that is, the hash value HV, the "Group1", and the public key APK2). Specifically, in T412, the printer 100 firstly executes a first PR determination process that is regarding whether or not the hash value HV and the group ID "Group1" in the received SCont for AP are respectively identical to the hash value HV and the group ID "Group1" in the SCont for printer included in the stored second CO. In the case of FIG. 6, the printer 100 determines "identical" in the first PR determination process, thus it determines that the authentication of the sender of the DRes (that is, the AP 6) succeeds. The fact that the hash value HV in the received SCont for AP is identical to the hash value HV in the SCont for printer included in the stored second CO means that the SCont for printer and the SCont for AP were created by the same device (that is, the terminal 10). As such, the printer 100 also determines that authentication of the creator of the received SCont for AP (that is, the terminal 10) succeeds. Further, the printer 100 decrypts the digital signature DS2 in the received SCont for AP by using the public key TPK2 of the terminal 10 included in the stored second CO. Since the decryption of the digital signature DS2 succeeds in the case of FIG. 6, the printer 100 executes a second PR determination process that is regarding whether or not a specific value obtained by decrypting the digital signature DS2 is identical to a value obtained by hashing the information in the received SCont for AP (that is, the hash value HV, the "Group1", and the public key APK2). In the case of FIG. 6, the printer 100 determines "identical" in the second PR determination process, thus it determines that the authentication of the information in the DRes succeeds, and executes processes from T414. The fact that the printer 100 determines "identical" in the second PR determination process means that the information in the received SCont for AP (that is, the hash value HV, the "Group1", and the public key APK2) has not been tampered by a third party since the first CO was stored in the AP 6. On the other hand, in a case where the printer 100 determines "not identical" in the first PR determination process, in a case where the decryption of the digital signature DS2 fails, or in a case where the printer 100 determines "not identical" in the second PR determination process, the printer 100 determines that the authentication fails and does not execute the processes from T414.

In T414, the printer 100 creates a connection key CK by using the stored secret key psk2 of the printer 100 and the public key APK2 of the AP 6 in the received SCont for AP in accordance with the ECDH. Here, the connection key CK created by the AP 6 in T404 and the connection key CK created by the printer 100 in T414 are identical to each other. Due to this, the connection key CK for establishing the Wi-Fi connection is shared between the printer 100 and the AP 6. When T414 is completed, the process of FIG. 6 is terminated.

As aforementioned, after the connection key CK is shared between the printer 100 and the AP 6, the printer 100 and the AP 6 execute the 4way-handshake communication by using the connection key CK in T40 of FIG. 2. As a result, the Wi-Fi connection is established between the printer 100 and the AP 6. As aforementioned, the printer 100 receives the AReq in T200 of FIG. 4 from the terminal 10 by using one communication channel among the plurality of communication channels included in the channel list of the printer 100. That is, the printer 100 receives the AReq in T200 from the terminal 10 by using the communication channel which both the printer 100 and the terminal 10 can use. On the other hand, in T40 of FIG. 2, the printer 100 establishes the Wi-Fi connection with the AP 6 by using the communication channel which both the printer 100 and the AP 6 can use. Here, the communication channel which the terminal 10 can use and the communication channel which the AP 6 can use may differ in some cases. In this embodiment, the communication channel by which the printer 100 receives the AReq from the terminal 10 in T200 of FIG. 4 is different from the communication channel by which the printer 100 establishes the Wi-Fi connection with the AP 6 in T40 of FIG. 2. However, in a variant, the former communication channel may be same as the latter communication channel.

Here, for example, a situation is assumed in which upon when the printer 100 prints the wireless setting image in T122 of FIG. 3, this printing of the wireless setting image is not completed due to an error (such as a paper jam) occurring in the print executing unit 118. In this case, since the terminal 10 cannot capture the wireless setting QR code in T132, it cannot execute the processes from T136. As such, the printer 100 does not receive the ARes from the terminal 10, and thus it does not need to operate in the respondent state. As described above, the respondent state is the state in which the processing load is higher as compared to the non-respondent state. Thus, if the printer 100 operates in the respondent state in the situation where it will not receive the ARes from the terminal 10, the processing load of the printer 100 is unnecessarily increased. In this embodiment, a reduction in the processing load of the printer 100 is realized by executing a process of FIG. 7.

Figure 7:
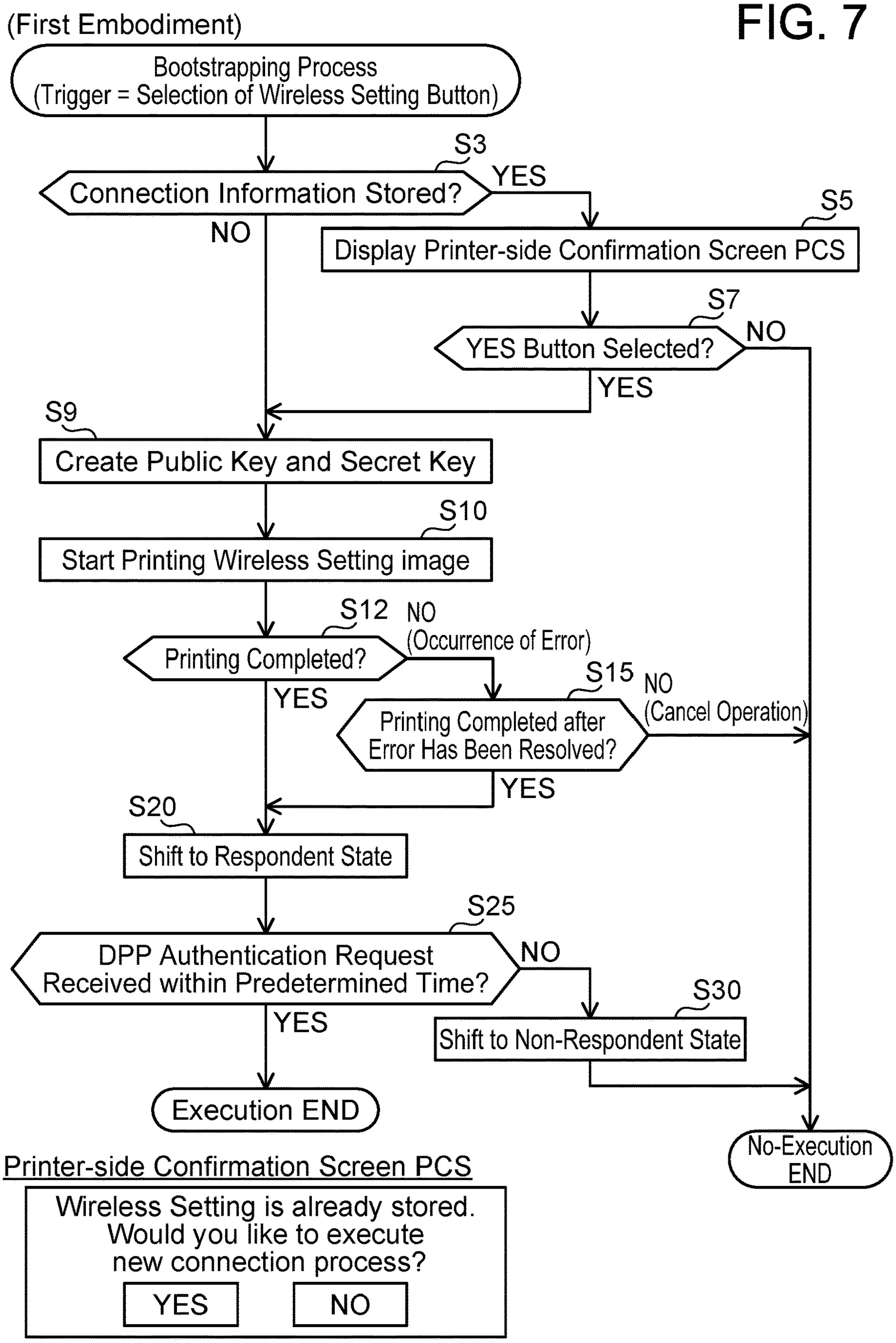
FIG. 7 shows a flowchart of the Bootstrapping process according to a first embodiment.

(Bootstrapping Process; FIG. 7)

Next, details of processes executed by the printer 100 in the process of the BS in FIG. 3 will be described with reference to FIG. 7. The process of FIG. 7 is executed in response to the selection of the wireless setting button in the setting screen SS displayed on the display unit 114 of the printer 100 (T120 of FIG. 3).

In S3, the printer 100 determines whether or not connection information for establishing the Wi-Fi connection with the AP 6 is stored in the memory 134. The printer 100 can establish the Wi-Fi connection with the AP 6 by using the DPP scheme, meanwhile it can also establish the Wi-Fi connection with the AP 6 according to a normal Wi-Fi scheme (that is, a scheme in which an SSID and a password are used) without using the DPP scheme. In a case where the Wi-Fi connection with the AP 6 has already been established by using the DPP scheme, the printer 100 already stores the second CO in the memory 134 (T312 of FIG. 5). Further, in a case where the Wi-Fi connection with the AP 6 has already been established according to the normal Wi-Fi scheme, the printer 100 already stores wireless setting information including the SSID and the password in the memory 134. The connection information, which is a determination target of S3, includes the second CO and the wireless setting information. In a case where one of the second CO and the wireless setting information is stored in the memory 134, the printer 100 determines YES in S3 and proceeds to S5. On the other hand, in a case where neither the second CO nor the wireless setting information is stored in the memory 134, the printer 100 determines NO in S3 and proceeds to S9.

In S5, the printer 100 causes the display unit 114 to display a printer-side confirmation screen PCS for confirming with the user whether or not to cause the printer 100 to execute communication according to the DPP scheme, that is, whether to cause the printer 100 to print the wireless setting image. The screen PCS includes a character string indicating that the connection information (in other words, the wireless settings) for the printer 100 to establish the Wi-Fi connection with the AP 6 is already stored, a YES button indicating that the wireless setting image is to be printed, and a NO button indicating that the wireless setting image is not to be printed. Due to this, the user can acknowledge that the printer 100 stores the connection information for establishing the Wi-Fi connection with the AP, that is, acknowledge that this connection information will be discarded if a process according to the DPP scheme is newly executed.

In S7, the printer 100 determines whether or not the YES button in the screen PCS is selected. In a case where the YES button in the screen PCS is selected by the user, the printer 100 determines YES in S7 and proceeds to S9. On the other hand, in a case where the NO button in the screen PCS is selected by the user, the printer 100 determines NO in S7 and terminates the process of FIG. 7 as no-execution END without executing processes from S9. The no-execution END means to cancel a process according to the DPP scheme.

In S9, the printer 100 creates the public key and the secret key (T121 of FIG. 3). Then, the printer 100 creates the wireless setting QR code by coding the created public key and the like. Here, each time the process of S9 is executed, the printer 100 creates a public key and a secret key that differ from the public key and the secret key that were previously created. As such, the printer 100 creates a wireless setting QR code that differs from the previously created wireless setting QR code each time the process of S9 is executed. Due to this, a Wi-Fi connection can be prevented from being established between the printer 100 and a device which the user of the printer 100 was not intending, due to the wireless setting QR code printed on a print medium being image-captured by a terminal of a third party.

In S10, the printer 100 creates the wireless setting image data by using the wireless setting QR code created in S9 and the app installation QR code stored in advance in the memory 134, and causes the print executing unit 118 to start printing according to the wireless setting image data (T122).

In S12, the printer 100 monitors whether the print executing unit 118 completes the printing. The printer 100 (that is, the CPU 132) determines YES in S12 in a case of obtaining information that indicates completion of the printing from the print executing unit 118, and shifts from the non-respondent state to the respondent state in S20 (T124).

On the other hand, the printer 100 (that is, the CPU 132) determines NO in S12 in a case of obtaining information that indicates an occurrence of an error prior to obtaining the information indicating completion of the printing from the print executing unit 118, and maintains to be in the non-respondent state. Then, in S15, the printer 100 monitors whether the printing is completed as a result of the error being resolved. The printer 100 determines YES in S15 in a case of obtaining the information indicating completion of the printing from the print executing unit 118, and shifts from the non-respondent state to the respondent state in S20. Due to this, the operation state of the printer 100 is shifted from the non-respondent state to the respondent state by the user simply performing an operation for resolving the error in the printer 100. Thus, the user's convenience is improved. On the other hand, the printer 100 determines NO in S15 in a case of accepting a cancel operation indicating that the printing should be cancelled from the user, instructs the print executing unit 118 to cancel the printing, and terminates the process of FIG. 7 as the no-execution END.

In S25, the printer 100 determines whether or not it has received the AReq within a predetermined time since it shifted to the respondent state in S20. In a case of having received the AReq within the predetermined time (T200), the printer 100 determines YES in S25 and terminates the process of FIG. 7 as an execution END where the processes from T202 of FIG. 4 are executed.

On the other hand, in a case of not having received the AReq within the predetermined time (NO in S25), the printer 100 shifts from the respondent state to the non-respondent state in S30, and terminates the process of FIG. 7 as the no-execution END. Due to this, the respondent state with the high processing load can be prevented from continuing over a long period of time in the printer 100.

(Effects of Embodiment)

In this embodiment, the printer 100 shifts its operation state from the non-respondent state to the respondent state (S20, T124) in the case where the printing of the wireless setting QR code is completed (YES in S12 of FIG. 7, T122 of FIG. 3), that is, in the case where the public key created in S9 is obtained by the terminal 10 and the AReq in which the public key is used can be received from the terminal 10. Due to this, in response to receiving the AReq from the terminal 10 (T200 of FIG. 4), the printer 100 can send the ARes to the terminal 10 (T210), receive the second CO from the terminal 10 (T310 of FIG. 5), and establish the Wi-Fi connection with the AP 6 by using the second CO (T35, T40 of FIG. 2). On the other hand, the printer 100 does not shift its operation state from the non-respondent state to the respondent state (S15 is executed without executing S20) in the case where the printing of the wireless setting QR code is not completed due to the occurrence of error (NO in S12 of FIG. 7), that is, in the case where the public key is not obtained by the terminal 10 and the AReq is not received from the terminal 10. As such, the processing load on the printer 100 can be reduced in the technique capable of establishing the Wi-Fi connection between the printer 100 and the AP 6 by using the terminal 10.

Further, in this embodiment, the printer 100 shifts from the non-respondent state to the respondent state (S20 of FIG. 7, T124) after the wireless setting button in the setting screen SS is selected by the user (T120 of FIG. 3). Due to this, in response to receiving the AReq from the terminal 10 (T200 of FIG. 4), the printer 100 can send the ARes to the terminal 10 (T210), receive the second CO from the terminal 10 (T310 of FIG. 5), and establish the Wi-Fi connection with the AP 6 by using the second CO (T35, T40 of FIG. 2). Further, in the case where the predetermined time elapses without receiving the AReq from the terminal 10 (NO in S25) in the situation where the printer 100 is in the respondent state after the wireless setting button in the screen SS has been selected, the printer 100 shifts to the non-respondent state with the lower processing load than in the respondent state (S30). As such, the processing load on the printer 100 can be reduced in the technique capable of establishing the Wi-Fi connection between the printer 100 and the AP 6 by using the terminal 10.

(Corresponding Relationships)

The terminal 10 and the AP 6 are respectively examples of "first external device" and "second external device". The Wi-Fi I/F 116 is an example of "wireless interface". The selection of the wireless setting button in the screen SS is an example of "print instruction". The wireless setting QR code and the public key created in S9 of FIG. 7 are respectively examples of "code image" and "public key". The AReq, the ARes, and the second CO are respectively examples of "authentication request", "authentication response", and "connection information". The Wi-Fi connection established in T40 of FIG. 2 is an example of "wireless connection".

The screen PCS is an example of "confirmation screen". The app installation QR code and the URL "U" are respectively examples of "different image" and "location information". The channel list, the communication channel used in T200 of FIG. 4, and the communication channel used in T40 of FIG. 2 are respectively examples of "communication channel information", "first communication channel", and "second communication channel". The SCont for AP and the hash values HV in the second CO are respectively examples of "received information" and "authentication information".

The process of T120 of FIG. 3, the process of S10, the process of T200 of FIG. 4, the process of T210, the process of T310 of FIG. 5, and the processes of T35 (and T40) of FIG. 2 are respectively examples of "accept a print instruction", "cause the print executing unit to start printing of a code image", "receive the authentication request", "send the authentication response", "receive connection information", and "establish the wireless connection between the printer and the second external device". The processes of S20 and S30 are examples of "control an operation state of the printer".

Figure 8:
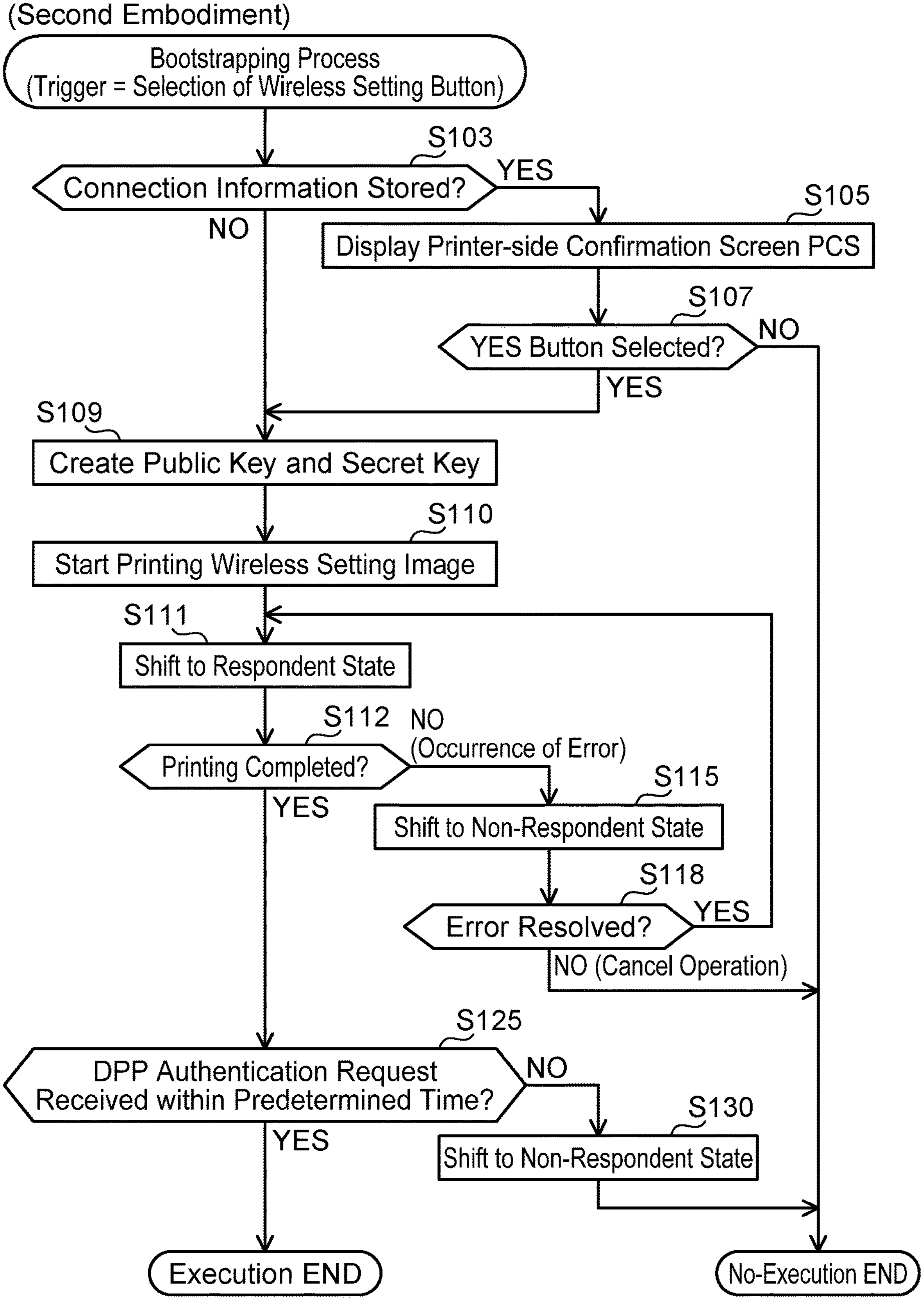
FIG. 8 shows a flowchart of the Bootstrapping process according to a second embodiment.

(Second Embodiment; FIG. 8)

In this embodiment, the printer 100 executes a process of FIG. 8 instead of the process of FIG. 7.

S103 to S110 are similar to S3 to S10 of FIG. 7. In S111, the printer 100 shifts from the non-respondent state to the respondent state before the printing is completed in the print executing unit 118. S112 is similar to S12 of FIG. 7. The printer 100 determines YES in S112 in the case of obtaining the information indicating completion of the printing from the print executing unit 118, and proceeds to S125 while maintaining to be in the respondent state.

The printer 100 determines NO in S112 in the case of obtaining the information indicating an occurrence of error from the print executing unit 118, and shifts from the respondent state to the non-respondent state in S115. Then, in S118, the printer 100 monitors whether the information indicating that the error has been resolved is obtained from the print executing unit 118. The printer 100 determines YES in S118 in a case of obtaining the information indicating that the error has been resolved from the print executing unit 118, returns to S111, and shifts from the non-respondent state to the respondent state. That is, the printer 100 shifts to the respondent state from the non-respondent state before the printing is completed. Due to this, the operation state of the printer 100 is shifted from the non-respondent state to the respondent state by the user simply performing the operation for resolving the error in the printer 100. Thus, the user's convenience is improved. On the other hand, the printer 100 determines NO in S118 in the case of accepting the cancel operation indicating that the printing should be cancelled from the user, instructs the print executing unit 118 to cancel the printing, and terminates the process of FIG. 8 as the no-execution END. S125 and S130 are similar to S25 and S30 of FIG. 7.

(Effects of Embodiment)

In this embodiment, the printer 100 shifts its operation state from the non-respondent state to the respondent state (S111) before the printing of the wireless setting QR code is completed. Further, in the case where the printing of the wireless setting QR code is not completed due to the occurrence of error (NO in S112 of FIG. 8), the printer 100 shifts its operation state from the respondent state to the non-respondent state (S115). As such, the processing load on the printer 100 can be reduced in the technique capable of establishing the Wi-Fi connection between the printer 100 and the AP 6 by using the terminal 10.

(Variant 1) The wireless setting QR code printed in T122 of FIG. 3 may not be one in which the channel list and the MAC address "abc" are coded. That is, "code image" simply needs to be an image obtained by coding at least the public key. In this case, in response to shifting from the non-respondent state to the respondent state in T124, the printer 100 monitors receipt of the AReq using one wireless channel among all the wireless channels which the printer 100 is capable of using. Further, in T200 of FIG. 4, the terminal 10 sequentially broadcasts the AReq by sequentially using all the wireless channels which the terminal 10 is capable of using.

(Variant 2) The processes for creating the shared key (for example, SK1) (such as T142, T202 of FIG. 4) are not limited to the processes according to the ECDH described in the above embodiment, but may be other processes according to the ECDH. Further, the processes for creating the shared key are not limited to the processes according to the ECDH, and processes according to other schemes (such as Diffie-Hellman key exchange (DH)) may be executed instead. Further, in the above embodiment, the digital signatures DS1 and DS2 are created according to the ECDSA, however, they may be created according to other schemes (such as Digital Signature Algorithm (DSA), Rivest-Shamir-Adleman cryptosystem (RAS), etc.).

(Variant 3) The printer 100 may execute the processes from T121 in response to receiving a specific signal (for example, a Probe Request including a predetermined character string) from the terminal 10 via the Wi-Fi I/F 116. That is, "print instruction" may not be an operation accepted via "operation unit".

(Variant 4) In the first embodiment, the process of S15 of FIG. 7 may be omitted. In this case, the printer 100 terminates the process of FIG. 7 as the non-execution END in the case of determining NO in S12. Further, in the second embodiment, the process of S118 of FIG. 8 may be omitted. In this case, the printer 100 shifts from the respondent state to the non-respondent state in S115 in the case of determining NO in S112 and terminates the process of FIG. 8 as the non-execution END.

(Variant 5) In a variant, after having shifted to the respondent state in S20 of FIG. 7, the printer 100 may cause the display unit 114 to display a specific screen including a shift button for shifting the operation state of the printer 100 from the respondent state to the non-respondent state. In this case, the printer 100 shifts from the respondent state to the non-respondent state in response to the shift button in the specific screen being selected by the user. According to this variant, the Wi-Fi connection can be prevented from being established between the printer 100 and the AP 6 by selecting the shift button in the specific screen, in a case where the user does not wish to establish this Wi-Fi connection (for example, in a case where the user selected the wireless setting button in the setting screen SS by mistake). In this variant, the selecting operation of the shift button is an example of a case where "specific condition" is satisfied.

(Variant 6) The "DRAFT Device Provisioning Protocol Technical Specification Version 0.2.11", which is the draft standard created by the Wi-Fi Alliance, describes that shared code, key, phrase, and word are called as "code". As such, the printer 100 may print a wireless setting image including a shared code, key, phrase, and word obtained by coding the public key PPK1, the channel list, and the MAC address "abc" in T122, instead of the wireless setting QR code.

(Variant 7) In T35 of FIG. 2, the process of the NA may be executed between the terminal 10 and the printer 100, and a Wi-Fi connection may thereby be established between the terminal 10 and the printer 100. That is, "second external device" may be the same device as "first external device".

(Variant 8) The process of T121 of FIG. 3 may be omitted. In this case, the printer 100 may store in advance in the memory 134 the public key PPK1, the secret key psk1, and the wireless setting QR code obtained by coding the public key PPK1. In this variant, "create a public key" and "create a code image" may be omitted.

(Variant 9) The wireless setting image printed in T122 may not include the app installation QR code. That is, "cause the print executing unit execute a printing of a different image" may be omitted.

(Variant 10) In the above embodiments, the Wi-Fi connection between the printer 100 and the AP 6 is established by using the terminal 10. Instead of this, for example, a Wi-Fi connection may be established between the printer 100 operating as a Group Owner (G/O) of the WFD scheme (that is, a device operating as a parent station) and another device (that is, a device operating as a child station) by using the terminal 10. That is, "second external device" may not be "parent station".

(Variant 11) In the embodiment above, the processes of FIGS. 2 to 8 are implemented by software (that is, the program 136), however, at least one of these processes may be implemented by hardware such as a logic circuit.

What is claimed is:

1. A printer comprising:

a print executing unit;

a wireless interface;

a processor; and a memory storing computer-readable instructions therein, the computer-readable instructions, when executed by the processor, causing the printer to:

accept a print instruction;

after the print instruction has been accepted, cause the print executing unit to start printing of a code image on a print medium, the code image being obtained by coding a public key, wherein in a case where the code image printed on the print medium is image-captured by a first external device, the public key is obtained by the first external device;

control an operation state of the printer, wherein in a case where the printing of the code image is completed after the printing of the code image has been started, the operation state of the printer is controlled to be a respondent state, the respondent state being a state in which an authentication response is sent to the first external device in response to receiving an authentication request in which the public key is used from the first external device;

receive the authentication request from the first external device via the wireless interface;

in a case where the authentication request is received from the first external device in a situation where the operation state of the printer is the respondent state, send the authentication response to the first external device via the wireless interface;

after the authentication response has been sent to the first external device, receive connection information from the first external device via the wireless interface, the connection information being for establishing a wireless connection between the printer and a second external device via the wireless interface; and in a case where the connection information is received from the first external device, establish, by using the connection information, the wireless connection between the printer and the second external device via the wireless interface.

2. The printer as in claim 1, wherein the operation state of the printer before the print instruction is accepted is a non-respondent state, the non-respondent state being a state in which the authentication response is not sent, in the case where the printing of the code image is completed after the printing of the code image has been started, the operation state of the printer is controlled to be the respondent state by shifting the operation state of the printer from the non-respondent state to the respondent state, and in a case where the printing of the code image is not completed due to an error occurring in the print executing unit after the printing of the code image has been started, the operation state of the printer is controlled to be the non-respondent state by maintaining the operation state of the printer in the non-respondent state.

3. The printer as in claim 2, wherein in a case where the printing of the code image is completed due to the error being resolved after the error has occurred in the print executing unit, the operation state of the printer is shifted from the non-respondent state to the respondent state.

4. The printer as in claim 1, wherein the operation state of the printer before the print instruction is accepted is a non-respondent state, the non-respondent state being a state in which the authentication response is not sent, after the print instruction has been accepted and before the printing of the code image is completed, the operation state of the printer is shifted from the non-respondent state to the respondent state, in the case where the printing of the code image is completed after the printing of the code image has been started, the operation state of the printer is controlled to be the respondent state by maintaining the operation state of the printer in the respondent state, and in a case where an error occurs in the print executing unit in a situation where the printing of the code image is being executed after the printing of the code image has been started and the operation state of the printer has been shifted to the respondent state, the operation state of the printer is controlled to be the non-respondent state by shifting the operation state of the printer from the respondent state to the non-respondent state.

5. The printer as in claim 4, wherein in a case where the error is resolved after the error has occurred in the print executing unit, the operation state of the printer is shifted from the non-respondent state to the respondent state.

6. The printer as in claim 1, wherein in a case where a specific condition is satisfied in a situation where the operation state of the printer is the respondent state after the print instruction has been accepted, the operation state of the printer is shifted from the respondent state to a non-respondent state, the non-respondent state being a state in which the authentication response is not sent.

7. The printer as in claim 6, wherein the specific condition is satisfied in a case where a predetermined time elapses without receiving the authentication request from the first external device in a situation where the operation state of the printer is the respondent state after the print instruction has been accepted.

8. The printer as in claim 1, wherein the computer-readable instructions, when executed by the processor, further cause the printer to:

every time the print instruction is accepted, create a public key different from a public key previously created; and every time a public key is created, create a code image different from a code image previously created by coding the created public key.

9. The printer as in claim 1 further comprising:

an operation unit; and a display unit, wherein the print instruction is accepted via the operation unit, the print executing unit is caused to start the printing of the code image on the print medium in a case where the print instruction is accepted via the operation unit in a situation where the connection information is not stored in the memory, the computer-readable instructions, when executed by the processor, further cause the printer to:

in the case where the connection information is received from the first external device, store the connection information in the memory; and in a case where the print instruction is accepted via the operation unit in a situation where the connection information is stored in the memory, cause the display unit to display a confirmation screen for confirming that the printer is to execute the printing of the code image, and in a case where it is instructed to cause the printer to execute the printing of the code image in a situation where the confirmation screen is displayed, the print executing unit is caused to start the printing of the code image on the print medium.

10. The printer as in claim 1, wherein the computer-readable instructions, when executed by the processor, further cause the printer to:

in the case where the print instruction is accepted, cause the print executing unit to execute printing of a different image that is different from the code image, the different image being related to location information indicating a location of an application program to be installed in the first external device.

11. The printer as in claim 1, wherein the code image is a QR code (registered trademark) obtained by coding the public key.

12. The printer as in claim 1, wherein the code image is obtained by coding the public key and communication channel information indicating a first communication channel being predetermined at the printer, in the case where the code image printed on the print medium is image-captured by the first external device, the public key and the communication channel information are obtained by the first external device, the respondent state is a state in which receipt of the authentication request by using the first communication channel is monitored from the first external device and the authentication response is sent to the first external device in response to receiving the authentication request from the first external device, and in a case where the authentication request is received by using the first communication channel from the first external device after the operation state of the printer has been shifted to the respondent state, the authentication response is sent to the first external device via the wireless interface.

13. The printer as in claim 12, wherein the wireless connection is established between the printer and the second external device via the wireless interface by using a second communication channel different from the first communication channel.

14. The printer as in claim 1, wherein the second external device is different from the first external device and is a parent device that is to operate as a parent station in a wireless network, and the wireless connection is established between the printer and the second external device via the wireless interface such that the printer participates in the wireless network as a child station.

15. The printer as in claim 1, wherein the connection information includes authentication information for authenticating received information which is received from the second external device.

16. The printer as in claim 1, wherein the computer-readable instructions, when executed by the processor, further cause the printer to:

after the authentication response has been sent to the first external device, operate as an Enrollee according to a Wi-Fi standard, wherein the first external device operates as a Configurator according to the Wi-Fi standard.

17. A printer comprising:

a print executing unit;

a wireless interface;

a processor; and a memory storing computer-readable instructions therein, the computer-readable instructions, when executed by the processor, causing the printer to:

accept a print instruction;

after the print instruction has been accepted, cause the print executing unit to start printing of a code image on a print medium, the code image being obtained by coding a public key, wherein in a case where the code image printed on the print medium is image-captured by a first external device, the public key is obtained by the first external device;

control an operation state of the printer, wherein after the print instruction has been accepted, the operation state of the printer is shifted from a non-respondent state to a respondent state, the non-respondent state being a state in which an authentication response is not sent, the respondent state being a state in which the authentication response is sent to the first external device in response to receiving an authentication request from the first external device, and in a case where a specific condition is satisfied in a situation where the operation state of the printer is the respondent state after the print instruction has been accepted, the operation state of the printer is shifted from the respondent state to the non-respondent state;

receive the authentication request from the first external device via the wireless interface;

in a case where the authentication request is received from the first external device in a situation where the operation state of the printer is the respondent state, send the authentication response to the first external device via the wireless interface;

after the authentication response has been sent to the first external device, receive connection information from the first external device via the wireless interface, the connection information being for establishing a wireless connection between the printer and a second external device via the wireless interface; and in a case where the connection information is received from the first external device, establish, by using the connection information, the wireless connection between the printer and the second external device via the wireless interface.

18. The printer as in claim 17, wherein the specific condition is satisfied in a case where a predetermined time elapses without receiving the authentication request from the first external device in a situation where the operation state of the printer is the respondent state after the print instruction has been accepted.

19. A non-transitory computer-readable recording medium storing computer-readable instructions for a printer, wherein the computer-readable instructions, when executed by a processor of the printer, cause the printer to:

accept a print instruction;

after the print instruction has been accepted, cause a print executing unit of the printer to start printing of a code image on a print medium, the code image being obtained by coding a public key, wherein in a case where the code image printed on the print medium is image-captured by a first external device, the public key is obtained by the first external device;

control an operation state of the printer, wherein in a case where the printing of the code image is completed after the printing of the code image has been started, the operation state of the printer is controlled to be a respondent state, the respondent state being a state in which an authentication response is sent to the first external device in response to receiving an authentication request in which the public key is used from the first external device;

receive the authentication request from the first external device via a wireless interface of the printer;

in a case where the authentication request is received from the first external device in a situation where the operation state of the printer is the respondent state, send the authentication response to the first external device via the wireless interface;

after the authentication response has been sent to the first external device, receive connection information from the first external device via the wireless interface, the connection information being for establishing a wireless connection between the printer and a second external device via the wireless interface; and in a case where the connection information is received from the first external device, establish, by using the connection information, the wireless connection between the printer and the second external device via the wireless interface.

20. A non-transitory computer-readable recording medium storing computer-readable instructions for a printer, wherein the computer-readable instructions, when executed by a processor of the printer, cause the printer to:

accept a print instruction;

after the print instruction has been accepted, cause a print executing unit of the printer to start printing of a code image on a print medium, the code image being obtained by coding a public key, wherein in a case where the code image printed on the print medium is image-captured by a first external device, the public key is obtained by the first external device;

control an operation state of the printer, wherein after the print instruction has been accepted, the operation state of the printer is shifted from a non-respondent state to a respondent state, the non-respondent state being a state in which an authentication response is not sent, the respondent state being a state in which the authentication response is sent to the first external device in response to receiving an authentication request from the first external device, and in a case where a specific condition is satisfied in a situation where the operation state of the printer is the respondent state after the print instruction has been accepted, the operation state of the printer is shifted from the respondent state to the non-respondent state;

receive the authentication request from the first external device via a wireless interface of the printer;

in a case where the authentication request is received from the first external device in a situation where the operation state of the printer is the respondent state, send the authentication response to the first external device via the wireless interface;

after the authentication response has been sent to the first external device, receive connection information from the first external device via the wireless interface, the connection information being for establishing a wireless connection between the printer and a second external device via the wireless interface; and in a case where the connection information is received from the first external device, establish, by using the connection information, the wireless connection between the printer and the second external device via the wireless interface.

* * * * *